(12) United States Patent
Crouch et al.

(10) Patent No.: US 12,450,228 B1
(45) Date of Patent: Oct. 21, 2025

(54) CONDITIONAL DATABASE SYNCHRONIZATION

(71) Applicant: State Farm Mutual Automobile Insurance Company, Bloomington, IL (US)

(72) Inventors: Jeff Crouch, Bloomington, IL (US); Calvin James Scarbrough, Jr., Plano, TX (US); Suresh Babu Gajendran, Fairview, TX (US); Jason Young, San Tan Valley, AZ (US); Isabelle Giovinazzo, Dallas, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 28 days.

(21) Appl. No.: 18/523,538

(22) Filed: Nov. 29, 2023

(51) Int. Cl.
*G06F 16/23* (2019.01)

(52) U.S. Cl.
CPC .................. *G06F 16/2379* (2019.01)

(58) Field of Classification Search
CPC ........................................................ G06F 16/23
See application file for complete search history.

(56) References Cited

U.S. PATENT DOCUMENTS

| | | | |
|---|---|---|---|
| 9,760,951 B2 | 9/2017 | Widener | |
| 10,366,352 B2 | 7/2019 | Smith | |
| 2008/0140460 A1 | 6/2008 | Smith et al. | |
| 2021/0149915 A1* | 5/2021 | Lee | G06F 16/2282 |
| 2021/0334239 A1* | 10/2021 | Banister | G06F 16/258 |
| 2021/0390097 A1* | 12/2021 | Rout | G06F 16/221 |
| 2021/0397631 A1* | 12/2021 | Rout | G06F 16/288 |
| 2023/0394017 A1* | 12/2023 | Terlecki | G06F 16/221 |
| 2023/0394172 A1* | 12/2023 | Thomson | G06F 21/6245 |

\* cited by examiner

*Primary Examiner* — Maher N Algibhah
(74) *Attorney, Agent, or Firm* — Lee & Hayes, P.C.

(57) ABSTRACT

This disclosure describes techniques for conditionally updating a target database using reference data received from a reference database. In some cases, an update management system is configured to periodically retrieve reference timestamps from the reference database and determine whether corresponding fields in the target database should be updated based on those reference timestamps. The determination of whether to update the target database may be based on automated checks of error indicators and update indicators maintained in a log database that is local to the update management system. An error indicator may represent whether a data record is associated with any error conditions that would prevent updating the target database based on that data record. An update indicator may represent whether the reference timestamp associated with a data record has already been used to successfully update the target database.

17 Claims, 5 Drawing Sheets

```
400 ─┐

┌─────────────────────────────────────────┐
                    │                                         │
                    │  STRUCT REFERENCEDATARECORD {            │
                    │                                         │
            402 ──▶ │    // REFERENCE TIMESTAMP                │
                    │    TIMESTAMP REFERENCETIMESTAMP          │
                    │                                         │
            404 ──▶ │    // KEY TO LOOKUP TARGET RECORD        │
                    │    STRING TARGETKEY                      │
                    │                                         │
            406 ──▶ │    // ERROR AND UPDATE INDICATORS        │
            408 ──▶ │    BOOLEAN ERRORINDICATOR                │
                    │    BOOLEAN UPDATEINDICATOR               │
                    │                                         │
            410 ──▶ │    // TARGET TIMESTAMP                   │
                    │    TIMESTAMP TARGETTIMESTAMP             │
                    │                                         │
            412 ──▶ │    // CALCULATED DEVIATION               │
                    │    INT TIMESTAMPDEVIATION                │
                    │                                         │
                    │  }                                       │
                    │                                         │
                    └─────────────────────────────────────────┘
```

FIG. 4

CONDITIONAL DATABASE SYNCHRONIZATION

TECHNICAL FIELD

The present disclosure relates to database management systems, and more particularly to techniques for database synchronization.

BACKGROUND

Cross-database data synchronization is a common challenge in many information technology systems. For example, keeping data synchronized across two or more different databases that store related information is a complex technical problem.

Existing solutions for cross-database synchronization have various drawbacks. For example, one approach is to perform periodic sequential batch updates, where the primary database is queried for updated data that is then used to update records in the secondary database. However, this approach does not scale efficiently for large datasets common in enterprise environments, because the sequential querying and updating of large batches of records is excessively time-consuming.

Examples of the techniques described in the present disclosure are directed to overcoming the deficiencies noted above.

SUMMARY

In some examples, the techniques described herein relate to a computer-implemented method, including receiving, by a processor, a first timestamp for a first data record, wherein the first data record is stored on a first database that is accessible by the processor via a first remote connection. The method further includes querying, by the processor, a second database to retrieve first log data, the first log data representing: (i) a first update indicator representing whether a third database has been updated based on the first data record, and (ii) a first error indicator representing whether the first data record is determined to have satisfied an error condition, wherein the second database is accessible by the processor via a local connection, and the third database is accessible by the processor via a second remote connection. The method further includes determining, by the processor and based on the first log data, that a first pending flag is affirmative, the first pending flag representing whether the first update indicator and the first error indicator are both negative. The method further includes, based on determining that the first pending flag is affirmative, querying, by the processor and based on the first data record, the third database to determine a second timestamp for the first data record. The method further includes updating, by the processor, the third database based on a first deviation between the first timestamp and the second timestamp. The method further includes updating, by the processor, the second database to set the first update indicator to affirmative.

In additional examples, the techniques described herein relate to a computing system, including a processor and memory storing computer-executable instructions that, when executed by the processor, cause the computing system to perform operations including receiving a first timestamp for a first data record, wherein the first data record is stored on a first database that is accessible by the processor via a first remote connection. The operations further include querying a second database to retrieve first log data, the first log data representing: (i) a first update indicator representing whether a third database has been updated based on the first data record, and (ii) a first error indicator representing whether the first data record is determined to have satisfied an error condition, wherein the second database is accessible by the processor via a local connection, and the third database is accessible by the processor via a second remote connection. The operations further include determining, based on the first log data, that a first pending flag is affirmative, the first pending flag representing whether the first update indicator and the first error indicator are both negative. The operations further include based on determining that the first pending flag is affirmative, querying, based on the first data record, the third database to determine a second timestamp for the first data record. The operations further include updating the third database based on a first deviation between the first timestamp and the second timestamp. The operations further include updating the second database to set the first update indicator to affirmative.

In further examples, the techniques described herein relate to one or more non-transitory computer-readable media storing computer-executable instructions that, when executed by the processor, cause the one or more processors to perform operations, including receiving a first timestamp for a first data record, wherein the first data record is stored on a first database that is accessible by the processor via a first remote connection. The operations further include querying a second database to retrieve first log data, the first log data representing: (i) a first update indicator representing whether a third database has been updated based on the first data record, and (ii) a first error indicator representing whether the first data record is determined to have satisfied an error condition, wherein the second database is accessible by the processor via a local connection, and the third database is accessible by the processor via a second remote connection. The operations further include determining, based on the first log data, that a first pending flag is affirmative, the first pending flag representing whether the first update indicator and the first error indicator are both negative. The operations further include based on determining that the first pending flag is affirmative, querying, based on the first data record, the third database to determine a second timestamp for the first data record. The operations further include updating the third database based on a first deviation between the first timestamp and the second timestamp. The operations further include updating the second database to set the first update indicator to affirmative.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 provides an operational example of a data structure that may store data associated with a reference timestamp.

DETAILED DESCRIPTION

This disclosure describes techniques for conditionally updating a target database using reference data received from a reference database. In some cases, an update management system is configured to periodically retrieve reference timestamps (e.g., estimated vehicle repair completion dates) from the reference database and determine whether corresponding fields in the target database should be updated based on those reference timestamps. The determination of whether to update the target database may be based on automated checks of error indicators and update indicators maintained in a log database that is local to the update management system. An error indicator may represent whether a data record is associated with any error conditions that would prevent updating the target database based on that data record. An update indicator may represent whether the reference timestamp associated with a data record has already been used to successfully update the target database.

Figure 1:
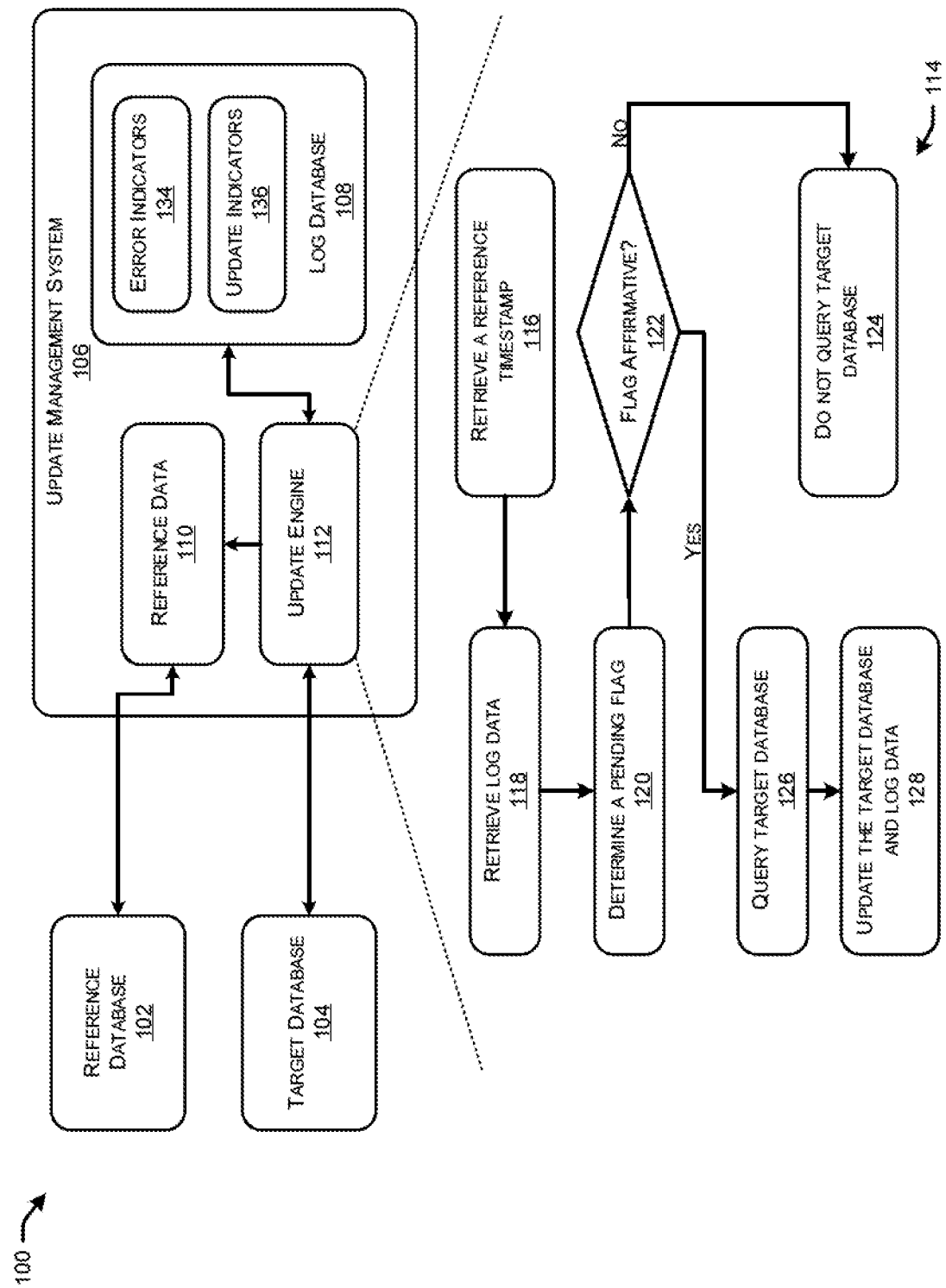
FIG. 1 depicts an example environment for conditionally updating a target database using data from a reference database.

FIG. 1 depicts an example environment 100 for conditionally updating a target database 104 using data from a reference database 102. As depicted in FIG. 1, the environment 100 includes an update management system 106 configured to retrieve reference data 110 from the reference database 102, determine whether each reference timestamp represented by the reference data 110 satisfies one or more update conditions, and conditionally update corresponding records in the target database 104 based on a reference timestamp if the reference timestamp satisfies the update conditions.

The reference database 102 may store a plurality of reference timestamps associated with a plurality of data records. Each reference timestamp may represent a date, such as a date when an event occurred, or a scheduled or estimated date at which an event may occur in the future. For example, a reference timestamp may represent a date associated with estimated completion of a car repair. In this example, the corresponding data record may represent an insurance policy, such as a car insurance policy.

The timestamps represented by data stored in the reference database 102 and/or the target database 104 may represent timestamps associated with particular events (e.g., with future events). For example, the timestamps stored by the reference database 102 may correspond to expected completion dates for various tasks. As another example, the timestamps stored by the target database 102 may correspond to end dates for particular arrangements. In some cases, the timestamps stored by the reference database 102 and/or the target database 104 represent timestamps associated with external events that do not relate to creation dates and/or edit dates of database records stored on the reference database 102 and/or the target database 104.

The reference database 102 may include at least one of a relational database management system (RDBMS), a Not Only Structured Query Language (NoSQL) database system, a graph-based database system, or an object-oriented database system. The reference database 102 may reside on one or more database server computers and may be accessed by the update management system 106 over a network such as a local area network (LAN) or wide area network (WAN). In some cases, the reference database 102 is remote from the update management system 106. The reference database 102 may be accessible by the update management system 106 via a remote connection.

In some cases, a data retrieval routine executed by the update management system 106 periodically retrieves reference timestamps stored by the reference database 102 on the update management system 106. For example, the data retrieval routine may store the reference timestamps on the update management system 106 using a file transfer protocol (FTP) connection.

The target database 104 may store a plurality of target timestamps associated with a plurality of data records. Each target timestamp may represent a date (e.g., an end-of-reservation date). For example, a target timestamp may represent a date associated with termination of a rental car reservation for an alternative car used during a car repair. In this example, the corresponding data record may represent an insurance policy, such as a car insurance policy.

The target database 104 may include at least one of an RDBMS, a NoSQL database system, a graph-based database system, or an object-oriented database system. The target database 104 may reside on one or more database server computers and may be accessed by the update management system 106 over a network such as a LAN or a WAN. In some cases, the target database 104 is remote from the update management system 106. The target database 104 may be accessible by the update management system 106 via a remote connection.

The update management system 106 may be configured to retrieve reference data 110 (e.g., reference timestamps) from the reference database 102, determine whether each reference timestamp represented by the reference data 110 satisfies one or more update conditions, and conditionally update corresponding timestamps in the target database 104 based on a reference timestamp if the reference timestamp satisfies the update conditions. The conditional update may be, for example, based on whether a reference timestamp is associated with an error indicator (e.g., representing that the corresponding data record is associated with a detected error) and/or an update indicator (e.g., representing that the corresponding timestamp stored on the target database 104 has already been updated).

The update management system 106 may include an update engine 112 and a log database 108. The update management system 106 may be remote from at least one of the reference database or the target database 104.

The log database 108 may store error indicators 134 and/or update indicators 136 associated with data records (e.g., insurance policy records). An error indicator may represent whether a corresponding data record is associated with any detected error conditions. The log database 108 may be accessible by the update management system 106 via a local connection and/or may be local to the update management system 106.

Examples of error conditions that may, if detected, cause the update engine 112 to set the error indicator associated with a data record to affirmative include: if the data record contains data fields that fail one or more automated validation checks, if the data record is missing required data fields (e.g., if the data record is not associated with a target timestamp stored on the target database 104, if the data record is not associated with a rental car reservation, if the data record is not associated with a car repair order, and/or the like), if the data record is associated with a data field that is invalid (e.g., a date that falls outside of an allowed date range), if a data field associated with the data record violates a database constraint associated with a database (e.g., with at least one of the reference database 102 or the target database 104), if a data record shares a primary key with another data record (e.g., if there are two rental car reservations and/or car repair orders for the same policy and/or the same car), and if the data record satisfies a pattern corresponding to a logical inconsistency and/or a suspected data entry mistake by a human agent.

An update indicator may represent whether the target timestamp associated with a corresponding data record has in a defined past period (e.g., since a time associated with the latest receipt of data from the reference database 102) been used to update the target database 104. For example, the update indicator may be a flag that is set to affirmative if the target timestamp associated with a corresponding data record has in a defined past period been used to update the target database 104 and if the update has been successfully completed without generating an error.

In some cases, after the update engine 112 retrieves a target timestamp, the update engine 112 determines whether the error indicator and the update indicator associated with the corresponding data record are both set to negative. If the error indicator and the update indicator are both set to negative, the update engine 112 proceeds to query the target database 104 to determine whether the data record is associated with a reference timestamp that is stored on that target database 104. If the update engine 112 determines that the data record is not associated with such a reference timestamp, the update engine 112 may generate an error, set the error indicator associated with the data record to affirmative, and maintain the update indicator associated with the data record as negative. This may indicate that, because of the generated error, updating of the target database 104 based on the retrieved reference timestamp has not been successfully completed.

Using update indicators 136 may enable update engine 112 to avoid duplicate updating of the target database 104 based on a single reference timestamp. When update engine 112 processes a reference timestamp, the update engine 112 may determine whether the update indicator associated with the reference timestamp is set to negative. If the update indicator is set to affirmative (e.g., indicating that the reference timestamp has in the past been used to successfully update the target database 104), the update engine 112 may refrain from updating the target database 104 based on the corresponding reference timestamp. However, if the update indicator is set to negative (e.g., indicating that the reference timestamp has not in the past been used to successfully update the target database 104), the update engine 112 may proceed to update the target database 104 based on the corresponding reference timestamp. Accordingly, in some cases, only reference timestamps with negative update indicators may trigger operations configured to update the target database 104.

Update indicators 136 may also facilitate parallel processing of reference data 110 without having to partition the reference data 110 into parallel processing batches assigned to different execution threads. In some cases, after an execution thread successfully updates a target database 104 based on a reference timestamp, the execution thread sets the update indicator associated with the reference timestamp to affirmative. This prevents other execution threads from attempting to update the target database 104 based on the reference timestamp.

In some cases, after an execution thread attempts to update a target database 104 based on a reference timestamp and detects that the corresponding data record is not associated with a target timestamp stored on the target database 104 (e.g., the corresponding data record is not associated with an active car rental reservation), the execution thread sets the error indicator associated with the reference timestamp to affirmative. This prevents other execution threads from attempting to update the target database 104 based on the reference timestamp.

In some cases, when the execution thread begins processing a reference timestamp by retrieving the update and error indicators associated with the timestamp, the execution thread locks the reference timestamp to prevent other execution threads from processing the timestamp. This locking mechanism ensures that at most one execution thread attempts to update the target database based on a given reference timestamp at any given time. Once the update or error handling is completed by the execution thread, the reference timestamp is unlocked, allowing other execution threads to process it in the future if needed.

In some cases, an update indicator is set to a negative value after a defined time period expires (e.g., after a new batch of reference timestamps are received during a periodic transfer). In some cases, the defined time period commences at a time associated with receiving a reference timestamp and ends at a time associated with receiving a subsequent timestamp for the same data record.

In some cases, the update indicators 136 are periodically set to negative (e.g., to indicate that reference timestamps associated with the data records have not been used to update the target database 104). For example, each time a new batch of reference timestamps are received, the corresponding update indicators may be set to negative to ensure that the reference timestamps are all used to update the target database 104. This may ensure that changes to reference timestamps (e.g., changes to estimated repair completion dates) are reflected in the target database 104 (e.g., in the car rental reservation dates).

For example, consider a scenario where, at time T1, the estimated repair date for a policy is Oct. 5, 2023. After update engine 112 processes this estimated date, update engine 112 may set the rental car end date for the policy to Oct. 6, 2023 on the target database 104 and set the update indicator for this policy to affirmative. This would prevent updating of the Oct. 6, 2023 date until a new batch of estimated repair dates are received from reference database 102. If, at time T2, the estimated repair date is set to Oct. 12, 2023, then the update engine 112 can reflect this change on the state of the reference database 102 as long as, at the time before processing of the Oct. 12, 2023 date, the corresponding update indicator is set to negative. For example, if upon receipt of the new batch of estimated repair completion dates the corresponding update indicators are set to negative, then the update engine 112 may process a subset of the new batch that are not associated with error conditions in full despite prior updates to the target database 104. To the extent the reference timestamp for a policy does not change across two batches, this updating of the target database 104 may lead to maintaining the existing state of the target database 104 for that policy across the two updates. To the extent the reference timestamp for a policy changes across two batches, updating of the target database 104 may lead to changing the state of the target database 104 across the two updates.

The update engine 112 may be configured to perform conditional update operations in relation to the target database 104 based on reference data 110 received from the reference data 110 and log data stored by the log database 108. Specifically, in some cases, the update engine 112 may retrieve a reference timestamp (e.g., a date associated with completion of a vehicle repair) from the reference data 110 and query the log database 108 to retrieve an error indicator and update indicator associated with the reference timestamp. If the error indicator indicates no errors (e.g., is set to negative) and the update indicator indicates no prior update (e.g., is set to negative), the update engine 112 determines the reference timestamp satisfies conditions for updating the target database 104. In this case, the update engine 112 queries the target database 104 to retrieve an associated target timestamp (e.g., a rental car reservation end date).

Based on results of querying the target database 104, the update engine 112 may conditionally update the target timestamp and/or the log database 108. For example, if the deviation between the reference and target timestamps is below a threshold deviation, the target timestamp may be maintained. As another example, if the deviation between the reference and target timestamps equals or exceeds the threshold deviation, the target timestamp may be modified to a time determined based on the reference timestamp, such as to one day after the reference timestamp. As a further example, if the query result indicates that the corresponding data record is not associated with a reference timestamp, then the error indicator associated with the data record may be set to affirmative (e.g., indicating that the data record is associated with an error condition, such as an error condition that requires manual intervention). In some cases, if either the error indicator or update indicator for the reference timestamp is set to affirmative (e.g., indicating an error condition or prior update), the update engine 112 determines the reference timestamp does not satisfy conditions for updating the target database 104. In this case, the update engine 112 may refrain from querying the target database 104 based on the corresponding data record.

In some cases, operations of the update engine 112 are performed by a robotics process automation (RPA) routine. For example, the RPA routine may be configured to periodically retrieve reference timestamps from the reference database 102, query the log database 108 for associated error and update indicators, and/or conditionally update the target database 104 based on the reference timestamps and indicator values.

In some cases, the RPA routine may determine whether to query and/or update the target database 104 based on update and/or error indicators maintained in log database 108. If the error and update indicators are both set to negative, the RPA routine may query the target database 104 to retrieve the corresponding target timestamp. If the query result indicates that the target timestamp deviates from the reference timestamp by more than a predefined threshold, the RPA routine may modify the target timestamp based on the reference timestamp. Otherwise, if the query result indicates that the target timestamp deviates from the reference timestamp by more than a predefined threshold, the RPA routine may maintain the corresponding target timestamp that is stored on the target database 104 in relation to the corresponding data record. In some cases, the RPA routine is a multi-threaded execution routine that uses two or more execution threads.

In some cases, the update engine 112 performs operations of the process 114 that is depicted in FIG. 1. As depicted in FIG. 1, process 114 begins at operation 116 when the update engine 112 retrieves a reference timestamp from the reference data 110. In some cases, reference timestamps stored on reference database 102 are periodically transferred to a storage component that is local to the update management system 106. In some cases, the reference data 110 includes reference timestamps associated with the latest transfer batch. Accordingly, in some cases, during each periodic transfer of reference timestamps from the reference database 102 to the update management system 106, the reference timestamps stored as part of the reference data 110 via prior reference data transfer(s) are removed and a new batch of reference timestamps are stored as part of the reference data 110.

In some cases, the reference data 110 includes, for each reference timestamp: (i) an indication of the reference timestamp, (ii) an indication of the corresponding data record associated with the reference timestamp, and/or (iii) an indication of one or more other metadata fields associated with the corresponding data record. For example, the reference data 110 may describe, for a car repair order, the estimated completion date of that order, the policy number and/or the vehicle identification number associated with that order, the location and/or area associated with that order, the auto repair shop associated with that order, and/or the like.

At operation 118, the update engine 112 retrieves log data associated with the reference timestamp from log database 108. The log data may include error indicator and/or the update indicator associated with the reference timestamp. To retrieve the log data associated with the reference timestamp, the update engine 112 may: (i) identify the data record associated with the reference timestamp (e.g., the vehicle insurance policy associated with the estimated repair completion date), and (ii) retrieve the error indicator and the update indicator associated with the data record.

For example, the error indicator associated with a car insurance policy may represent whether the policy is associated with (e.g., determined to have satisfied) an error condition (e.g., whether the policy is associated with an active car reservation). As another example, the update indicator associated with a car insurance policy may represent whether the car reservation associated with the policy has been updated based on the latest estimated repair completion date.

At operation 120, the update engine 112 determines a pending flag associated with the reference timestamp based on the log data associated with the reference timestamp. The pending flag may represent whether the reference timestamp should be used to query and/or update the target database. If the pending flag associated with a reference timestamp is set to affirmative, then the target database 104 may be determined to eligible for being queried to determine whether the target database 104 includes a target timestamp associated with the corresponding data record. If the pending flag associated with a reference timestamp is set to negative, then the target database 104 may be determined to ineligible for being queried to determine whether the target database 104 includes a target timestamp associated with the corresponding data record.

In some cases, the update engine 112 determines the pending flag associated with the reference timestamp based on the error indicator and the update indicator associated with the reference timestamp. For example, the update engine 112 may determine an affirmative pending flag associated with a reference timestamp if: (i) the update indicator associated with the corresponding data record is set to negative (e.g., indicating that the target database 104 has not been successfully updated based on the reference timestamp within a predefined past period, such as since the latest receipt of a batch of reference timestamps from the reference database 102), and (ii) if the error indicator associated with the corresponding data record is set to negative (e.g., indicating that the corresponding data record is not associated with a detected error condition).

As another example, the update engine 112 may determine a negative pending flag associated with a reference timestamp if: (i) the update indicator associated with the corresponding data record is set to affirmative (e.g., indicating that the target database 104 has been successfully updated based on the reference timestamp within a predefined past period, such as since the latest receipt of a batch of reference timestamps from the reference database 102), and/or (ii) if the error indicator associated with the corresponding data record is set to affirmative (e.g., indicating that the corresponding data record is associated with at least one detected error condition).

Exemplary techniques for determining a pending flag associated with a reference timestamp are described in greater detail below with reference to FIG. 2.

At operation 122, update engine 112 determines whether the pending flag associated with the reference timestamp is set to affirmative. If the pending flag is not set to affirmative (i.e., is set to negative), then the update engine proceeds to operation 124 to refrain from querying the target database 104 based on the reference timestamp. In some cases, having a negative pending flag indicates either that the corresponding data record is associated with a detected error condition (e.g., the corresponding policy is associated with a car repair order but not an active car reservation), the corresponding reference timestamp has already been used to update the target database 104, or both. In either of those three conditions, updating of the target database 104 may be avoided because the presence of error conditions and/or prior updates that make such updates premature and/or unnecessary.

If update engine 112 determines, at operation 122, that the pending flag for the reference timestamp is set to affirmative, then operations 126 and 128 are performed. At operation 126, the update engine 112 queries the target database 104 based on the reference timestamp. For example, update engine 112 may query the target database 104 to determine whether an insurance policy associated with an estimated car repair date has a corresponding active car reservation. The query to the target database 104 may be a relational select query to determine the target timestamp stored on the target database 104, where the relational query may use the primary key associated with the corresponding data record (e.g., based on a unique policy identifier associated with the corresponding car insurance policy).

At operation 128, the update engine 112 updates the target database 104 and the log data stored in the log database 108 based on the results of querying the target database 104. In some cases, the results of querying the target database 104 based on a reference timestamp may be one of three results: (i) a first potential result indicating that the corresponding data record is associated with a target timestamp stored on the target database 104 and that the target timestamp is within a threshold deviation of the reference timestamp (e.g., the two timestamps fall on the same date or are separated by less than a threshold number of days), (ii) a second potential result indicating that the corresponding data record is associated with a target timestamp stored on the target database 104 and that the target timestamp is not within a threshold deviation of the reference timestamp, and (iii) a third potential result indicating that the corresponding data record is not associated with a target timestamp stored on the target database 104 (e.g., the corresponding policy is not associated with an active car reservation). The third potential result may indicate absence of a corresponding reference timestamp for a data record.

In some cases, if the query result corresponds to the first potential result described above, the update engine 112 may maintain the target timestamp and set the corresponding update indicator to affirmative (e.g., to indicate that the reference timestamp has been successfully used to update the target database 104). If the query result corresponds to the second potential result described above, the update engine 112 may modify the target timestamp (e.g., to a timestamp determined based on the reference timestamp) and set the corresponding update indicator to affirmative (e.g., to indicate that the reference timestamp has been successfully used to update the target database 104). If the query result corresponds to the second potential result described above, the update engine 112 may set the error indicator associated with the corresponding data record to affirmative (e.g., to indicate that the corresponding data record is associated with a detected error condition, for example to trigger manual intervention with respect to the data record by a human agent).

Exemplary techniques for updating the target database 104 and the log data stored in the log database 108 based on the results of querying the target database 104 in accordance with a reference timestamp are described below with reference to FIG. 3.

Accordingly, environment 100 enables an update management system 106 to conditionally update a target database 104 based on reference data 110 received from a reference database 102 as well as based on error indicators 134 and update indicators 136 maintained in a log database 108. The reference data 110 may include a set of reference timestamps, such as a set of estimated car return completion dates. If a reference timestamp is associated with a negative error indicator (e.g., indicating that the corresponding data record is not associated with a detected error condition) and a negative update indicator (e.g., indicating that the reference timestamp has not been successfully used to update the target database 104 within a predefined past period), the update engine 112 of the update management system 106 queries the target database 104 to determine whether the corresponding data record (e.g., the corresponding insurance policy) is associated with a target timestamp (e.g., a rental car termination date) stored on the target database 104. If a reference timestamp is associated with either or both of an affirmative error indicator (e.g., indicating that the corresponding data record is associated with a detected error condition) or an affirmative update indicator (e.g., indicating that the reference timestamp has been successfully used to update the target database 104 within a predefined past period), the update engine 112 refrains from querying the target database 104 to determine whether the corresponding data record is associated with a target timestamp stored on the target database 104.

If the update engine 112 queries the target database 104 to determine whether a data record is associated with a target timestamp stored on the target database 104 and the query result indicates that the data record is associated with a target timestamp that does not deviate from the corresponding reference timestamp by a deviation threshold (e.g., if the estimated repair date and the rental car termination date for a policy match), then the update engine 112 may maintain the target timestamp and modify the update indicator associated with the data record to indicate an affirmative value (e.g., to indicate that the reference timestamp has been used to update the target database 104 within the predefined past period). If the update engine 112 queries the target database 104 to determine whether a data record is associated with a target timestamp stored on the target database 104 and the query result indicates that the data record is associated with a target timestamp that deviates from the corresponding reference timestamp by a deviation threshold (e.g., if the estimated repair date and the rental car termination date for a policy do not match), then the update engine 112 may modify the target timestamp to a timestamp determined based on the reference timestamp (e.g., modify the reservation termination date to one day after the estimated repair date) and modify the update indicator associated with the data record to indicate an affirmative value (e.g., to indicate that the reference timestamp has been used to update the target database 104 within the predefined past period).

If the update engine 112 queries the target database 104 to determine whether a data record is associated with a target timestamp stored on the target database 104 and the query result indicates that the data record is not associated with a target timestamp stored on the target database 104 (e.g., the insurance policy is not associated with an active car reservation), then the update engine 112 may update the error indicator associated with the data record to indicate an affirmative value (e.g., to indicate that the data record is associated with a detected error condition, such as a detected error condition that requires manual intervention).

One set of technical advantages of the techniques enabled by the environment 100 result from dividing a conditional cross-database update task that may be performed on large batches of reference data into simpler atomic operations defined by individual queries and/or checks. This division of a complex cross-database update task into atomic check/query operations enables performing the task by an RPA routine, such as a multi-threaded RPA routine. The multi-threaded RPA routine may use a set of execution threads that may be performed in a parallelized arrangement, where each execution thread performs a sequence of check/query operations without the need to coordinate with other execution threads or monitor the overall execution context across other execution threats. In this arrangement, the error indicators 134 and update indicators 136 provide mechanisms for inter-thread communication using shared data.

Accordingly, the techniques enabled by environment 100 can be performed using a parallel processing routine with a so-called "shared memory" strategy. This results in various technical advantages over other cross-database update solutions: first, using parallel processing to perform a conditional cross-database update task results in faster completion times relative to sequential processing solutions, because the parallel processing approach uses a set of threads that are performed in parallel instead of sequentially. The workload can thus be distributed across threads, increasing overall throughput across a fixed period.

Second, the loose coupling between threads provided by the shared indicators (e.g., by error indicators 134 and/or update indicators 136 that are accessible by all execution threads) enables efficient inter-thread synchronization without relying on complex and computationally expensive inter-thread coordination logic like message passing. The threads can simply read and write the shared error and update indicators to implicitly coordinate, which reduces the need for operations configured to enable threads to communicate using explicit messages. Accordingly, the techniques enabled by environment 100 reduce the computational complexity of performing conditional cross-database update in a parallelized manner.

Another technical advantage resulting from the techniques enabled by environment 100 relates to reducing network bandwidth usage by limiting the number of queries to the target database 104. In some cases, checking the update indicators 136 before target database 104 queries avoids extraneous network transmissions to query and/or update records that have already been updated. This enhances network transmission efficiency and reduces overall network bandwidth consumption compared to approaches that may re-query and/or re-update the same data.

Figure 2:
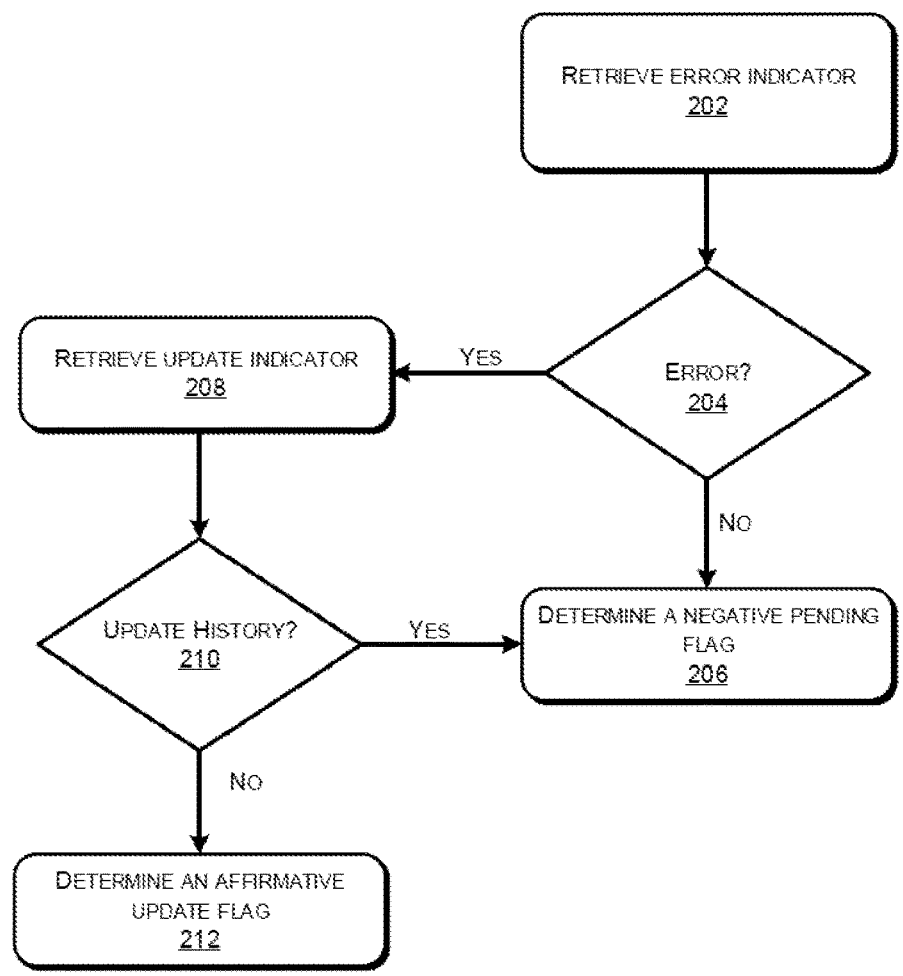
FIG. 2 is a flowchart diagram of an example process for determining a pending flag associated with a reference timestamp.

FIG. 2 is a flowchart diagram of an example process 200 for determining a pending flag associated with a reference timestamp. The process 200 may be performed, for example, by update engine 112 of the update management system 106.

As depicted in FIG. 2, at operation 202, update engine 112 retrieves an error indicator associated with the reference timestamp. The error indicator may represent whether the data record corresponding to the reference timestamp is associated with one or more detected error conditions. For example, the error indicator may indicate the presence of any validation errors, missing required fields, invalid data values, constraint violations, duplicate records, and/or other logical inconsistencies associated with the data record. In some cases, the error indicator may represent whether a car insurance policy is associated with a detected error condition.

For example, a car insurance policy may be determined to be associated with an error condition if the policy is associated with a repair order but not a rental car reservation. As another example, a car insurance policy may be determined to be associated with an error condition if the policy is associated with a repair order and a rental car reservation that is in an area that is outside of a threshold distance from a location associated with the policyholder. As an additional another example, a car insurance policy may be determined to be associated with an error condition if the policy is associated with two overlapping rental car reservations, which may indicate a potential data entry error.

At operation 204, the update engine 112 determines whether the error indicator associated with the reference timestamp indicates that the reference timestamp is associated with an error condition. Examples of error conditions include: if the data record contains data fields that fail one or more automated validation checks, if the data record misses required data fields, if the data record is associated with a data field that is invalid, if a data field associated with the data record violates a database constraint associated with a database, if a data record shares a primary key with another data record (e.g., if there are two rental car reservations and/or car repair orders for the same policy and/or the same car), and if the data record satisfies a pattern corresponding to a logical inconsistency and/or a suspected data entry mistakes by a human agent.

If the update engine 112 determines that the error indicator associated with the reference timestamp indicates that the reference timestamp is not associated with an error condition (operation 204—No), then the update engine 112 proceeds to operation 206 to set a negative pending flag associated with the reference timestamp. The negative pending flag may represent that the reference timestamp should not be used to update the target database 104.

If the update engine 112 determines that the error indicator associated with the reference timestamp indicates that the reference timestamp is associated with an error condition (operation 204—Yes), then the update engine 112 proceeds to operation 208 to retrieve the update indicator associated with the reference timestamp. The update indicator may represent whether the target timestamp associated with the reference timestamp has in a defined past period (e.g., since a time associated with the latest receipt of data from the reference database 102) been used to query the target database 104. For example, the update indicator may be a flag or bit that is set to affirmative or negative to indicate whether the corresponding target timestamp has already been updated based on the current reference timestamp in a preceding update cycle. This can prevent duplicate updates of the target database using the same reference timestamp.

At operation 210, the update engine 112 determines whether the update indicator associated with the reference timestamp has in a defined past period (e.g., since a time associated with the latest receipt of data from the reference database 102) been used to query the target database 104. If the update engine 112 determines that the update indicator associated with the reference timestamp has in a defined past period been used to query the target database 104 (operation 210—Yes), then the update engine 112 proceeds to operation 206 to set a negative pending flag associated with the reference timestamp. The negative pending flag may represent that the reference timestamp should not be used to update the target database 104.

If the update engine 112 determines that the update indicator associated with the reference timestamp has not in a defined past period been used to query the target database 104 (operation 210—No), then the update engine 112 proceeds to operation 212 to set an affirmative pending flag associated with the reference timestamp. The affirmative pending flag may represent that the reference timestamp should be used to update the target database 104.

Accordingly, in some cases, using the process 200, the update engine 112 determines a pending flag for a reference timestamp. The pending flag may then be used to determine whether to update the target database 104 based on the reference timestamp. Thus, process 200 may enable determining which reference timestamps are eligible for cross-database synchronization.

Figure 3:
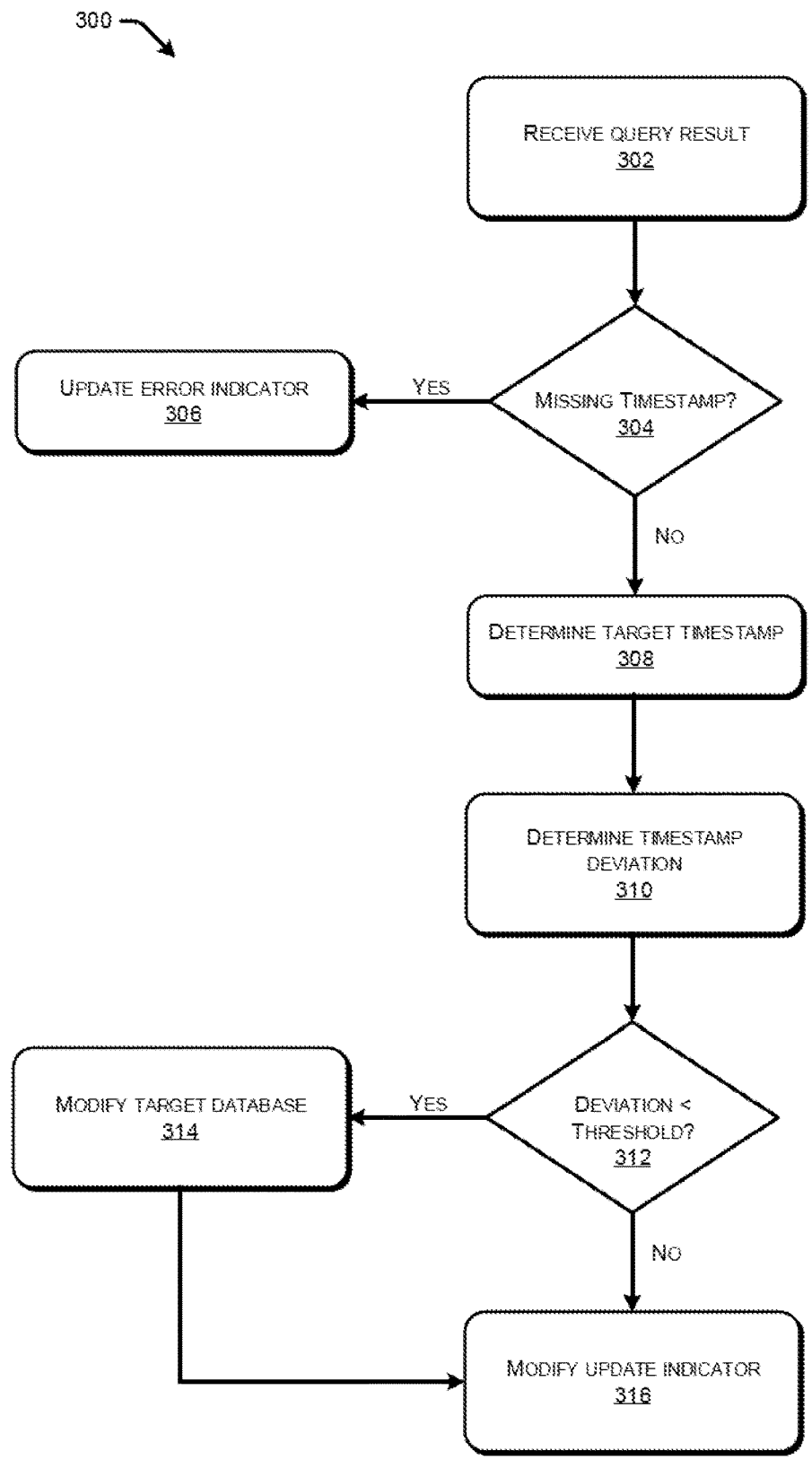
FIG. 3 is a flowchart diagram of an example process for updating a target database the log data stored in a log database based on the results of querying the target database in accordance with a reference timestamp.

FIG. 3 is a flowchart diagram of an example process 300 for updating the target database 104 and the log data stored in the log database 108 based on the results of querying the target database 104 in accordance with a reference timestamp. The process 300 may be performed, for example, by update engine 112 of the update management system 106.

As depicted in FIG. 3, at operation 302, update engine 112 receives the result of querying the target database 104 in accordance with the reference timestamp. In some cases, the result of querying the target database 104 in accordance with the reference timestamp can be one of three results: (i) a first potential result indicating that the corresponding data record is associated with a target timestamp stored on the target database 104 and that the target timestamp is within a threshold deviation of the reference timestamp (e.g., the two timestamps fall on the same date or are separated by less than a threshold number of days), (ii) a second potential result indicating that the corresponding data record is associated with a target timestamp stored on the target database 104 and that the target timestamp is within a threshold deviation of the reference timestamp, and (iii) a third potential result indicating that the corresponding data record is not associated with a target timestamp stored on the target database 104 (e.g., the corresponding policy is not associated with an active car reservation).

At operation 304, the update engine 112 determines whether the query results indicates that the corresponding data record is not associated with a target timestamp stored on the target database 104. For example, the update engine 112 may determine that the query results indicates that the corresponding data record is not associated with a target timestamp stored on the target database 104 if the corresponding data record is not associated with any data records stored on the target database 104 (e.g., if the corresponding policy is not associated with an active car reservation).

As another example, the update engine 112 may determine that the query results indicates that the corresponding data record is not associated with a target timestamp stored on the target database 104 if the corresponding data record is not associated with a data record on the target database 104 that is within a geographic region associated with the corresponding data record (e.g., if the corresponding policy is not associated with an active car reservation within a geographic region of the policyholder).

If the update engine 112 determines that the query results indicates that the corresponding data record is not associated with a target timestamp stored on the target database 104 (operation 304—Yes), then the update engine 112 proceeds to operation 306 to update the error indicator associated with the corresponding data record to an affirmative value. In some cases, setting the corresponding error indicator to affirmative causes the data record to be subject to an alternative processing workflow, such as a processing workflow that includes a manual intervention by an expert human agent. The alternative processing workflow may be configured to detect, verify, address, and/or correct the error condition indicated by the affirmative error indicator.

If the update engine 112 determines that the query results indicates that the corresponding data record is associated with a target timestamp stored on the target database 104 (operation 304—No), then the update engine 112 proceeds to operation 308 to determine the target timestamp associated with the reference timestamp. The target timestamp may be a timestamp associated with a data record that is stored on the target database 104. An example of a target timestamp is a rental car reservation end date stored in the target database for an insurance policy record. This reference timestamp may correspond to a reference timestamp such as an estimated vehicle repair completion date for the same policy.

At operation 310, the update engine 112 determines a timestamp deviation based on the reference timestamp and the target timestamp. The timestamp deviation may represent a measure of deviation between the reference and target timestamps. For example, the timestamp deviation may include a measure of (e.g., a number of days between, a number of days separating, and/or the like) an estimated car repair date and a rental car reservation end date for a car insurance policy.

At operation 312, the update engine 112 determines whether the timestamp deviation falls below a threshold (e.g., a threshold of zero). In some cases, the timestamp deviation falls below a threshold only if the reference timestamp and the target timestamp match. In some cases, the timestamp deviation falls below a threshold if the reference timestamp and the target timestamp deviate from each other by less than a threshold measure of deviation.

If update engine 112 determines that the timestamp deviation falls below a threshold (operation 312—Yes), the update engine 112 proceeds to operation 314 to modify the target timestamp stored on the target database 104 to a value determined based on the reference timestamp. For example, the modified value of the target timestamp may be determined by adding a predefined offset period to the reference timestamp. In some cases, the update engine 112 modifies the target timestamp to one day after the reference timestamp. For example, the update engine 112 may set the rental car reservation date to one day after the estimated car return date. After operation 314, update engine 112 proceeds to operation 316.

If update engine 112 determines that the timestamp deviation falls below a threshold (operation 312—No), the update engine 112 proceeds to operation 316 to modify the update indicator associated with the reference timestamp to an affirmative value. In some cases, setting the update indicator to an affirmative value represents that the reference timestamp has been used to successfully update the target database 104, which means the reference timestamp will not be used to update the target database 104 until the update indicator is again set to a negative value.

In some cases, the update engine 112 processes reference timestamps in batches, where each batch corresponds to reference data 110 received during a periodic transfer from the reference database 102. For each reference timestamp, the update engine 112 checks the associated error indicator and update indicator to determine whether to query the target database 104. If the target database 104 is queried, the update engine 112 checks the result to conditionally update the target timestamp and the indicators based on whether the target timestamp matches the reference timestamp. This continues until all reference timestamps in the batch are processed.

Accordingly, in some cases, using the process 300, the update engine 112 queries the target database 104 based on a reference timestamp and uses the query result to update the log data and the target timestamp associated with the reference timestamp. Thus, process 300 may enable synchronizing the target database 104 and the reference database 102 based on an eligible reference timestamp.

FIG. 4 provides an operational example of a data structure 400 that may store data associated with a reference timestamp during processing of the reference timestamp by the update engine 112 of the update management system 106.

As depicted in FIG. 4, the data structure 400 includes a field 402 that stores a reference timestamp value received from the reference database. The timestamp value may, for example, be an estimated car return completion date.

As further depicted in FIG. 4, the data structure 400 includes a field 404 that stores an identifier that can be used to query a corresponding data record in the target database 104. The identifier may, for example, be an identifier of an insurance policy associated with a car repair order, such as a car insurance policy number.

As further depicted in FIG. 4, the data structure 400 includes a field 406 that stores an error indicator associated with the reference timestamp. The error indicator may represent whether the corresponding record is associated with any detected error conditions that may prevent updating of the target database and/or require manual intervention with respect to the corresponding record.

As further depicted in FIG. 4, the data structure 400 includes a field 408 that stores an update indicator associated with the reference timestamp. The update indicator may represent whether the target database 104 has already been updated using the reference timestamp in a defined past period (e.g., to prevent duplicate updates using the same timestamp).

As further depicted in FIG. 4, the data structure 400 includes a field 410 that stores a target timestamp associated with the reference timestamp. The target timestamp may be a timestamp value that was looked up from the target database 104 using the identifier stored in field 404. The target timestamp may, for example, be a rental car reservation date. In some cases, if the reference timestamp was not used to query the target database 104 or if the reference timestamp is not associated with any target timestamps stored on the target database 104, field 410 may be assigned a null value.

As further depicted in FIG. 4, the data structure 400 includes a field 412 that stores a computed deviation between the reference timestamp stored in field 402 and the target timestamp stored in field 410. The computed deviation may represent, for example, a number of days between an estimated vehicle repair completion date and a rental car reservation end date.

Figure 5:
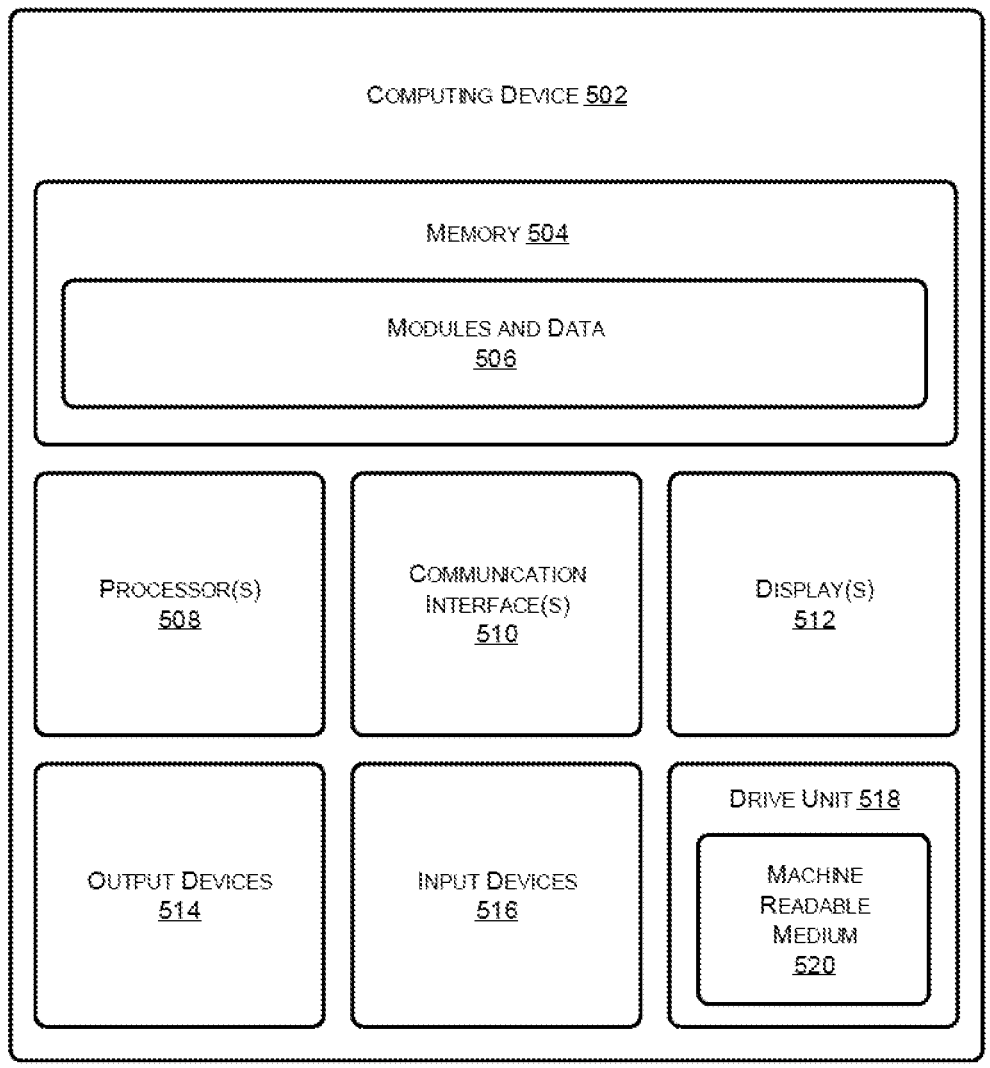
FIG. 5 shows an example system architecture for a computing device associated with an environment described herein.

FIG. 5 shows an example system architecture for a computing device 502 associated with the environment 100 described herein. A computing device 502 can be a server, computer, or other type of computing device that executes at least a portion of the environment 100. In some examples, elements of the environment 100 can be distributed among, and/or be executed by, multiple computing devices 502.

A computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 502 associated with the environment 100. Any such non-transitory computer-readable media may be part of the computing devices 502. The memory 504 can include modules and data 506 needed to perform operations of one or more computing devices 502 of the environment 100.

One or more computing devices 502 of the environment 100 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions (e.g., a set of computer-executable instructions), such as software or firmware, that embodies any one or more of the methodologies or functions described herein. The instructions can also reside, completely or at least partially, within the memory 504, processor(s) 508, and/or communication interface(s) 510 during execution thereof by the one or more computing devices 502 of the environment 100. The memory 504 and the processor(s) 508 also can constitute machine readable media 520. The instructions may cause the processor(s) 508 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
    receiving, by a processor, a first timestamp for a first data record, wherein the first data record is stored on a first database that is accessible by the processor via a first remote connection;
    querying, at a first time, by the processor, and using a first execution thread, a second database to retrieve first log data, the first log data representing: (i) a first update indicator representing whether a third database has been updated based on the first data record, and (ii) a first error indicator representing whether the first data record is determined to have satisfied an error condition, wherein:
        the second database is accessible by the processor via a local connection, and
        the third database is accessible by the processor via a second remote connection;
    determining, by the processor and based on the first log data, that a first pending flag is affirmative and indicates that the first update indicator and the first error indicator are both negative;
    based on determining that the first pending flag is affirmative, querying, by the processor and based on the first data record, the third database to determine a second timestamp for the first data record;
    updating, by the processor, the third database based on a first deviation between the first timestamp and the second timestamp;
    updating, by the processor, the second database to set the first update indicator to affirmative; and
    querying, at a second time after the first time, by the processor, and using a second execution thread executed in parallel with the first execution thread, the second database to retrieve the first update indicator, wherein:
        the first execution thread and the second execution thread are associated with a shared memory for intra-thread communication, and
        the shared memory stores the first update indicator.

2. The method of claim 1, further comprising:
    querying, by the processor and at a third time, the second database to retrieve the first log data;
    based on querying the second database at the second time, determining, by the processor and based on the first log data, that the first pending flag is affirmative; and
    based on determining that the first pending flag is affirmative, refraining, by the processor, from querying the third database based on the first data record.

3. The method of claim 1, wherein the first execution thread and the second execution thread are performed by a multi-threaded robotics process automation (RPA) routine.

4. The method of claim 1, further comprising:
    receiving, by the processor, a third timestamp for a second data record, wherein the second data record is stored on the first database;
    querying, by the processor, the second database to retrieve second log data, the second log data representing: (i) a second update indicator representing whether the third database has been updated based on the second data record, and (ii) a second error indicator representing whether the second data record is determined to have satisfied the error condition;
    determining, by the processor and based on the second log data, that a second pending flag is affirmative, the second pending flag representing whether the second update indicator and the second error indicator are both negative;
    based on determining that the second pending flag is affirmative, querying, by the processor and based on the second data record, the third database to determine absence of a fourth timestamp corresponding to the second data record on the third database; and
    based on determining that absence of the fourth timestamp, updating, by the processor, the second database to set the second error indicator to affirmative.

5. The method of claim 1, further comprising:
    receiving, by the processor, a third timestamp for a second data record, wherein the second data record is stored on the first database;
    querying, by the processor, the second database to retrieve second log data, the second log data representing: (i) a second update indicator representing whether the third database has been updated based on the second data record, and (ii) a second error indicator representing whether the second data record is determined to have satisfied the error condition;
    determining, by the processor and based on the second log data, that a second pending flag is negative, the second pending flag representing whether the second update indicator and the second error indicator are both negative; and
    based on determining that the second pending flag is negative, refraining, by the processor, from querying the third database based on the second data record.

6. The method of claim 1, wherein:
the first update indicator represents whether the third database has been updated based on the first data record during a first time period; and
the first update indicator is set to negative after the first time period expires.

7. The method of claim 6, wherein the first time period commences based a first time associated with receiving the first timestamp and ends based on a second time associated with receiving the second timestamp.

8. The method of claim 1, further comprising:
triggering, by the processor, an RPA routine, wherein the RPA routine is configured to query the second database and query the third database.

9. The method of claim 1, wherein receiving the first timestamp comprises receiving the first timestamp based on data transferred using a file transfer protocol (FTP) connection.

10. A computing system, comprising:
a processor; and
memory storing computer-executable instructions that, when executed by the processor, cause the computing system to perform operations comprising:
receiving a first timestamp for a first data record, wherein the first data record is stored on a reference database that is accessible by the processor via a first remote connection;
querying, at a first time and using a first execution thread, a log database to retrieve first log data, the first log data representing: (i) a first update indicator representing whether a target database has been updated based on the first data record, and (ii) a first error indicator representing whether the first data record is determined to have satisfied an error condition, wherein:
the log database is accessible by the processor via a local connection, and
the target database is accessible by the processor via a second remote connection;
determining, based on the first log data, that a first pending flag is affirmative, the first pending flag indicating that the first update indicator and the first error indicator are both negative;
based on determining that the first pending flag is affirmative, querying, based on the first data record, the target database to determine a second timestamp for the first data record;
updating the target database based on a first deviation between the first timestamp and the second timestamp;
updating the log database to set the first update indicator to affirmative; and
querying, at a second time after the first time and using a second execution thread executed in parallel with the first execution thread, the log database to retrieve the first update indicator, wherein:
the first execution thread and the second execution thread are associated with a shared memory for intra-thread communication, and
the shared memory stores the first update indicator.

11. The computing system of claim 10, wherein the operations further comprise:
querying, at a third time, the log database to retrieve the first log data;
based on querying the log database at the third time, determining, based on the first log data, that the first pending flag is affirmative; and
based on determining that the first pending flag is affirmative, refraining from querying the target database based on the first data record.

12. The computing system of claim 10, wherein the first execution thread and the second execution thread are performed by a multi-threaded robotics process automation (RPA) routine.

13. The computing system of claim 10, the operations further comprising:
receiving a third timestamp for a second data record, wherein the second data record is stored on the reference database;
querying the log database to retrieve second log data, the second log data representing: (i) a second update indicator representing whether the target database has been updated based on the second data record, and (ii) a second error indicator representing whether the second data record is determined to have satisfied the error condition;
determining, based on the second log data, that a second pending flag is affirmative, the second pending flag representing whether the second update indicator and the second error indicator are both negative;
based on determining that the second pending flag is affirmative, querying, based on the second data record, the target database to determine absence of a fourth timestamp corresponding to the second data record on the target database; and
based on determining that absence of the fourth timestamp, updating the log database to set the second error indicator to affirmative.

14. One or more non-transitory computer-readable media storing computer-executable instructions that, when executed by a processor, cause the processor to perform operations, comprising:
receiving a first timestamp for a first data record, wherein the first data record is stored on a first database that is accessible by the processor via a first remote connection;
querying, at a first time and using a first execution thread, a second database to retrieve first log data, the first log data representing: (i) a first update indicator representing whether a third database has been updated based on the first data record, and (ii) a first error indicator representing whether the first data record is determined to have satisfied an error condition, wherein:
the second database is accessible by the processor via a local connection, and
the third database is accessible by the processor via a second remote connection;
determining, based on the first log data, that a first pending flag is affirmative, the first pending flag indicating that the first update indicator and the first error indicator are both negative;
based on determining that the first pending flag is affirmative, querying, based on the first data record, the third database to determine a second timestamp for the first data record;
updating the third database based on a first deviation between the first timestamp and the second timestamp;
updating the second database to set the first update indicator to affirmative; and
querying, at a second time after the first time and using a second execution thread executed in parallel with the first execution thread, the second database to retrieve the first update indicator, wherein:

the first execution thread and the second execution thread are associated with a shared memory for intra-thread communication, and the shared memory stores the first update indicator.

15. The one or more non-transitory computer-readable media of claim 14, wherein the operations further comprise:

querying, at a third time, the second database to retrieve the first log data;

based on querying the second database at the third time, determining, based on the first log data, that the first pending flag is affirmative; and based on determining that the first pending flag is affirmative, refraining from querying the third database based on the first data record.

16. The one or more non-transitory computer-readable media of claim 14, wherein the first execution thread and the second execution thread are performed by a multi-threaded robotics process automation (RPA) routine.

17. The one or more non-transitory computer-readable media of claim 14, the operations further comprising:

receiving a third timestamp for a second data record, wherein the second data record is stored on the first database;

querying the second database to retrieve second log data, the second log data representing: (i) a second update indicator representing whether the third database has been updated based on the second data record, and (ii) a second error indicator representing whether the second data record is determined to have satisfied the error condition;

determining, based on the second log data, that a second pending flag is affirmative, the second pending flag representing whether the second update indicator and the second error indicator are both negative;

based on determining that the second pending flag is affirmative, querying, based on the second data record, the third database to determine absence of a fourth timestamp corresponding to the second data record on the third database; and based on determining that absence of the fourth timestamp, updating the second database to set the second error indicator to affirmative.

* * * * *